US012789291B2

(12) United States Patent
Tokiyasu

(10) Patent No.: US 12,789,291 B2
(45) Date of Patent: Nov. 10, 2026

(54) WHEEL MANUFACTURING DEVICE AND WHEEL MANUFACTURING METHOD

(71) Applicant: Honda Motor Co., Ltd., Tokyo (JP)

(72) Inventor: Masakazu Tokiyasu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 748 days.

(21) Appl. No.: 18/311,897

(22) Filed: May 4, 2023

(65) Prior Publication Data

US 2023/0405720 A1 Dec. 21, 2023

(30) Foreign Application Priority Data

May 23, 2022 (JP) ................................ 2022-084056

(51) Int. Cl.
*B23K 26/28* (2014.01)
*B60B 19/00* (2006.01)

(52) U.S. Cl.
CPC ............ *B23K 26/28* (2013.01); *B60B 19/003* (2013.01); *B60B 2310/3026* (2013.01)

(58) Field of Classification Search
CPC ........ B23K 26/08; B23K 26/21; B23K 26/28; B23K 26/282; B23K 37/0435; B23K 26/0884; B23K 26/00; B23K 26/24; B60B 2310/3026; B60B 19/003
See application file for complete search history.

(56) References Cited

U.S. PATENT DOCUMENTS

| | | | | |
|---|---|---|---|---|
| 4,326,118 A * | 4/1982 | Smith | .................... | B23K 26/28 219/121.64 |
| 2013/0147256 A1* | 6/2013 | Denney | ................... | B60B 3/087 219/121.64 |

FOREIGN PATENT DOCUMENTS

| | | |
|---|---|---|
| JP | 2017210035 A * | 11/2017 |
| JP | 6746655 | 8/2020 |

* cited by examiner

*Primary Examiner* — Abiy Teka
(74) *Attorney, Agent, or Firm* — JCIPRNET

(57) ABSTRACT

A wheel manufacturing device for manufacturing a wheel having an annular core body configured by multiple segments and multiple free rollers rotatably provided around an annular axis of the core body includes: a holder that includes a center jig having a circular outer contour; and a laser welder that welds adjacent segments. The laser welder sets an optical axis of the laser in a direction orthogonal to an outer peripheral surface of the segment when welding a portion of the outer peripheral surface of the segment away from a central axis of the annular axis, and sets the optical axis in a direction inclined away from the central axis with respect to the direction orthogonal to the outer peripheral surface of the segment when welding a portion of the outer peripheral surface of the segment close to the central axis.

14 Claims, 12 Drawing Sheets

(A)

(B)

WHEEL MANUFACTURING DEVICE AND WHEEL MANUFACTURING METHOD

CROSS-REFERENCE TO RELATED APPLICATION

This application claims the priority benefit of Japan application serial no. 2022-084056, filed on May 23, 2022. The entirety of the above-mentioned patent application is hereby incorporated by reference herein and made a part of this specification.

BACKGROUND

Technical Field

The disclosure relates to a wheel manufacturing device, a wheel manufacturing method, and a welding method for manufacturing a wheel used in an omnidirectional mobile device.

Related Art

Patent Literature 1 discloses a wheel manufacturing method for a wheel used in an omnidirectional mobile device. The wheel has an annular core and multiple free rollers rotatably supported by the core. The wheel manufacturing method includes a first step of forming multiple cutouts in a straight pipe material, a second step of attaching multiple free rollers in the straight pipe material, a third step of bending the pipe material at multiple locations to fill the multiple cutouts to form the pipe material into an annular shape, and a fourth step of welding the ends of the pipe material together and welding the edges of the cutouts together.

CITATION LIST

Patent Literature

[Patent Literature 1] Japanese Granted Patent No. 6746655

In the fourth step, the ends of the pipe members (also called segments) to which the free rollers are attached are welded together. However, since the free roller is provided on the pipe material, it is difficult to access the pipe material, and it is not easy to perform TIG welding. Therefore, it is desired to develop a wheel manufacturing device which facilitates welding of pipe materials and which can easily form a core body.

In view of the above, the disclosure provides a wheel manufacturing device and a wheel manufacturing method capable of easily manufacturing a wheel having an annular core and multiple free rollers rotatably supported by the core.

SUMMARY

An embodiment of the disclosure in view of the above provides a wheel manufacturing device (1) for manufacturing a wheel having an annular core body (2) configured by multiple arc-shaped segments (7) joined to each other and multiple free rollers (3) rotatably provided around an annular axis of the core body. The wheel manufacturing device includes: a holder (21) that includes a center jig (29) having a circular outer contour and holds the segments in a state of butting against each other on an outer periphery of the center jig; and a laser welder (23) that welds adjacent segments by irradiating a laser. The laser welder sets an optical axis (E) of the laser in a direction orthogonal to an outer peripheral surface (7A) of the segment when welding a portion of the outer peripheral surface of the segment away from a central axis of the annular axis, and sets the optical axis in a direction inclined away from the central axis with respect to the direction orthogonal to the outer peripheral surface of the segment when welding a portion of the outer peripheral surface of the segment close to the central axis.

An embodiment of the disclosure in view of the above provides a wheel manufacturing method for manufacturing a wheel having an annular core body (2) configured by multiple arc-shaped segments (7) joined to each other and multiple free rollers (3) rotatably provided around an annular axis of the core body. The wheel manufacturing method includes: a holding step of holding the segments in a state of butting against each other on an outer periphery of a center jig (29) having a circular outer contour; and a welding step of welding adjacent segments by irradiating a laser. An optical axis (E) of the laser is set in a direction orthogonal to an outer peripheral surface (7A) of the segment when a portion of the outer peripheral surface of the segment away from a central axis of the annular axis is welded, and the optical axis is set in a direction inclined away from the central axis with respect to the direction orthogonal to the outer peripheral surface of the segment when a portion of the outer peripheral surface of the segment close to the central axis is welded.

DESCRIPTION OF THE EMBODIMENTS

Figure 1:
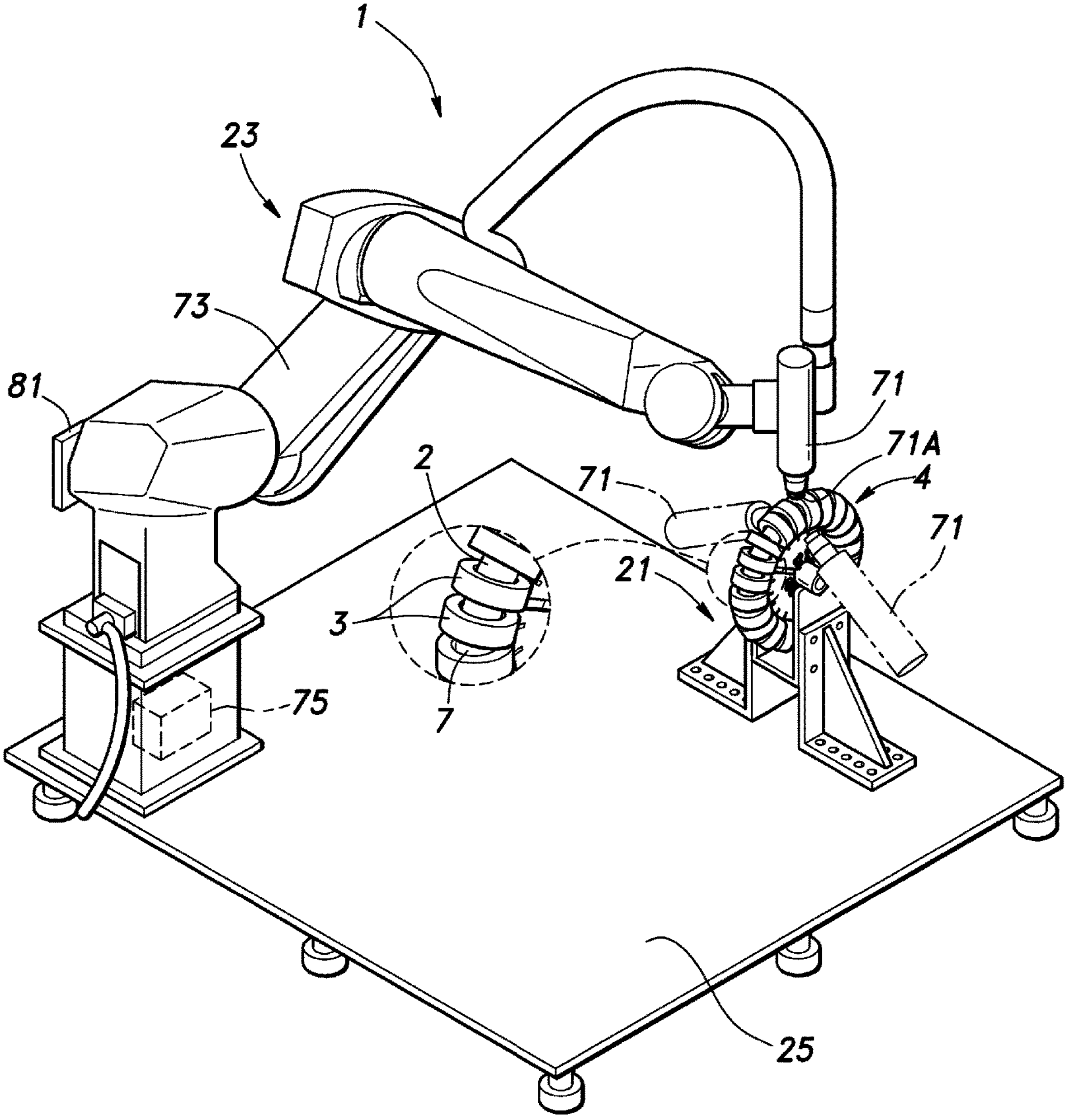
FIG. 1 is a perspective view of a wheel manufacturing device according to an embodiment, and an enlarged view of the portion surrounded by a dashed line.

According to the embodiment, even if the free rollers are provided on the segment, the segment may be welded along the entire circumferential direction to form the core while avoiding interference between the free rollers and the laser welder. Therefore, it is possible to provide a wheel manufacturing device capable of easily manufacturing a wheel having an annular core and multiple free rollers rotatably supported by the core.

In the above embodiment, it is preferable that the laser welder includes a head (71) that irradiates the laser and a manipulator (73) that moves the head, and the manipulator disposes at least a portion of the head at a position overlapping the free roller as viewed in an axial direction of the segment when the segment is welded.

According to this embodiment, the head may be brought close to the segment. In this way, the adjacent segments may be welded together more reliably.

In the above embodiment, it is preferable that the holder holds the segment from two sides of the central axis.

According to this embodiment, the segment may be held by the holder well.

In the above embodiment, it is preferable that the holder further includes a support member (27) that supports the center jig; the center jig includes a chuck (41), multiple bases (43) radially movably supported by the chuck and capable of being in contact with the free roller by moving radially outward, and a shaft (45) provided at a center of the chuck; and the support member supports two ends of the shaft.

According to this embodiment, the holder may have a simple structure, and the segment may be well supported by the holder.

In the above embodiment, it is preferable that the shaft is located radially inside the base.

According to this embodiment, the holder may be configured compactly. Also, during welding, interference between the shaft and the laser welder is less likely to occur.

In the above embodiment, it is preferable that the shaft restricts a radially inward movement of the base by contacting a radially inner side of the base.

According to this embodiment, the base may be held at a proper position with respect to the chuck with a simple configuration.

In the above embodiment, it is preferable that the chuck includes a through hole (42) through which the shaft passes, and the shaft includes a first member (65) inserted into the through hole from one side and a second member (67) joined to the first member on the other side of the through hole.

According to this embodiment, the shaft may be configured simply, and the shaft may be easily assembled.

In the above embodiment, it is preferable that the first member and the second member are provided with screw holes (69) communicating with each other in an axial direction.

According to this embodiment, the first member and the second member may be firmly joined.

In the above embodiment, it is preferable that the support member includes a V-shaped groove (39) that is recessed downwardly for respectively receiving the two ends of the shaft.

According to this embodiment, the segment may be held by the holding member to be rotatable about the axis of the shaft. Therefore, the position of the segment may be adjusted so that the position of the segment to be welded is at a proper position by the operator who performs manufacturing.

In the above embodiment, it is preferable that a width of the base in a direction parallel to the central axis is smaller than a width of the free roller in the direction parallel to the central axis.

According to this embodiment, since the width of the base in the axial direction is smaller than the width of the free roller in the axial direction, the driving of the laser welder is less likely to be hindered by the base during welding.

According to this embodiment, the core is configured by laser welding the segments.

Therefore, even if the free rollers are provided on the segment, the segment may be welded along the entire circumferential direction while avoiding interference between the free rollers and the laser welder. Therefore, it is possible to provide a wheel manufacturing method capable of easily manufacturing a wheel having an annular core and multiple free rollers rotatably supported by the core.

According to the above configuration, it is possible to provide a wheel manufacturing device and a wheel manufacturing method capable of easily manufacturing a wheel having an annular core and multiple free rollers rotatably supported by the core.

Figure 2:
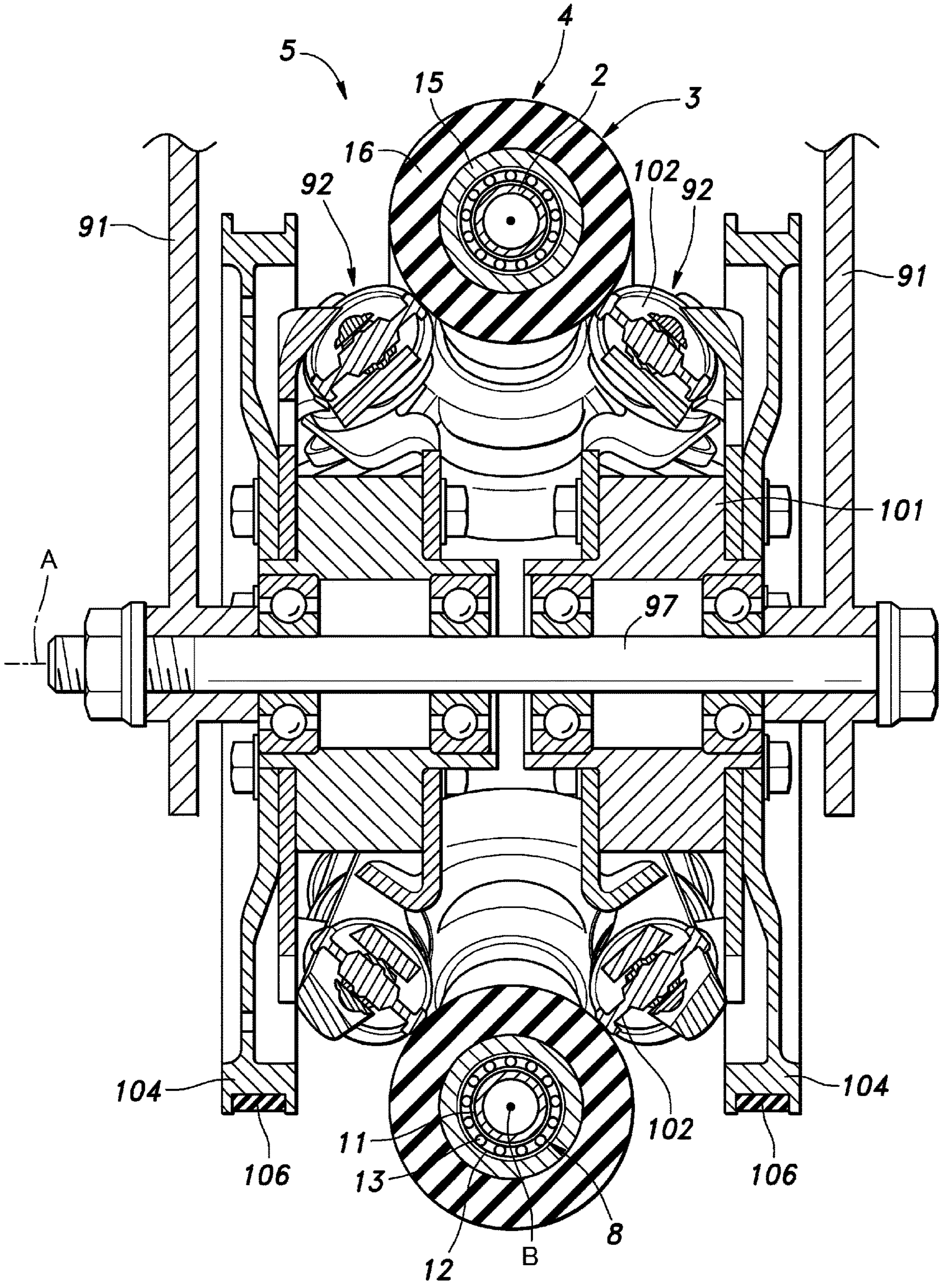
FIG. 2 is a cross-sectional view of an omnidirectional mobile device including a wheel.

A wheel manufacturing device 1 according to the disclosure will be described below with reference to the drawings. As shown in FIG. 1, a wheel manufacturing device 1 is used to manufacture a wheel 4 having an annular core body 2 and multiple free rollers 3 rotatably provided on the core body 2. As shown in FIG. 2, the wheel 4 manufactured by the wheel manufacturing device 1 are provided in an omnidirectional mobile device 5. The omnidirectional mobile device 5 is used for electric wheelchairs, trolleys, and personal mobility vehicles.

Figure 3:
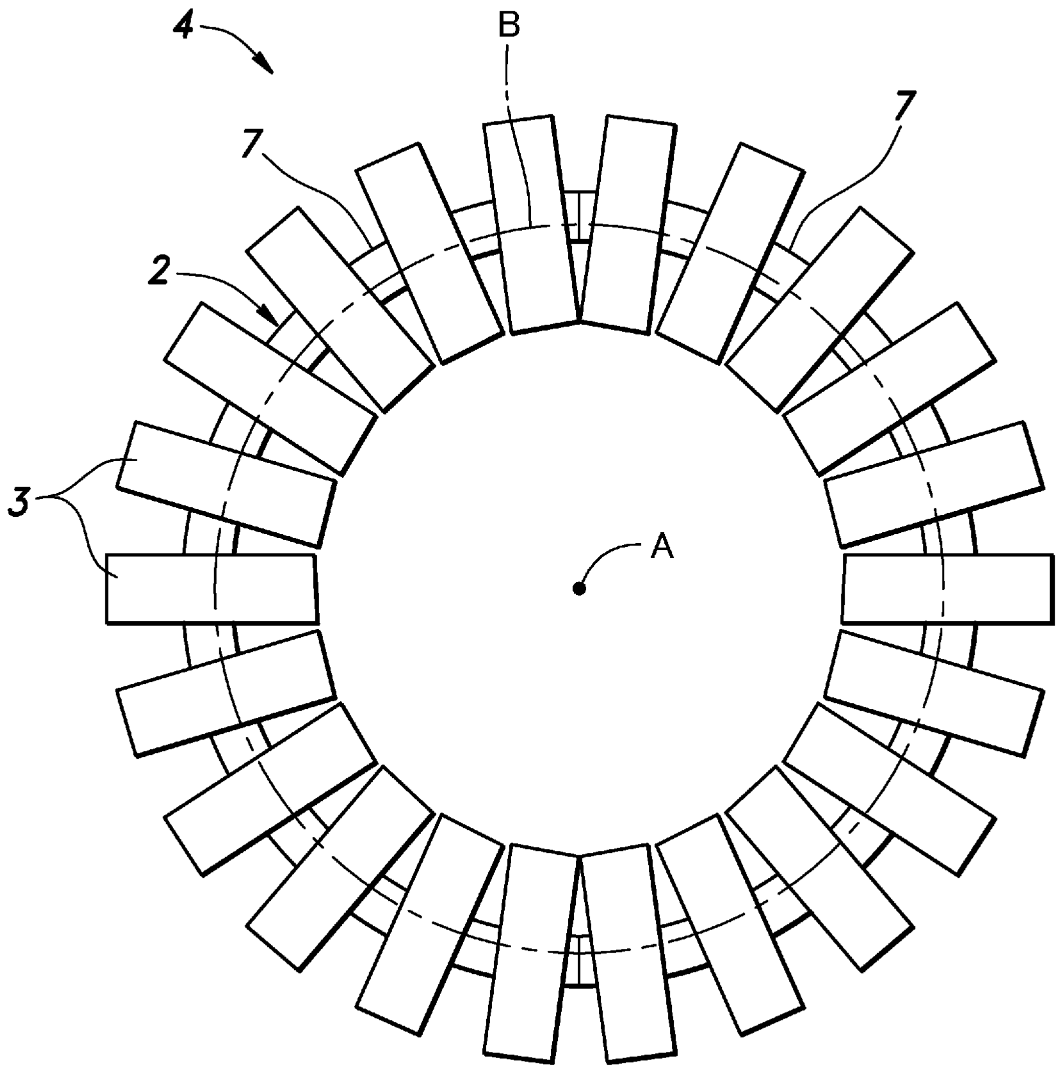
FIG. 3 is a side view of the wheel.
Figure 4:
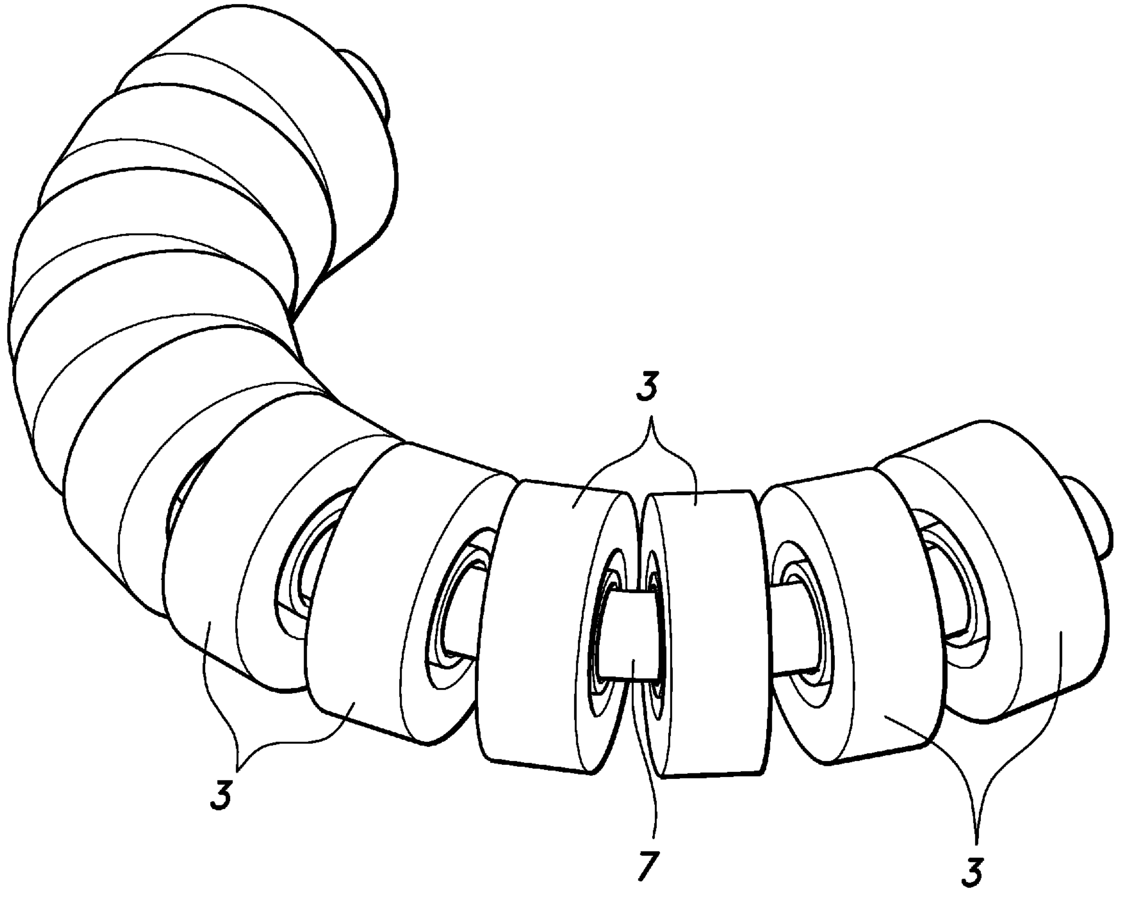
FIG. 4 is a perspective view showing a pipe member provided with free rollers.

As shown in FIG. 3, the core body 2 has an annular shape centered on an axis A. As shown in FIG. 4, the core body 2 includes multiple arc-shaped pipe materials 7 whose ends are butt-welded to each other. The pipe material 7 corresponds to a segment forming the core body 2. That is, the core body 2 includes multiple segments (pipe materials 7) each having an arc shape and joined to each other. In this embodiment, the core body 2 is semicircular and includes two semicircular pipe materials 7 (segments) that are joined together.

As shown in FIG. 4, the pipe material 7 is a so-called round pipe material having a cylindrical shape with a circular cross section, and is made of metal such as stainless steel. As shown in FIG. 3, a line passing through the center of the cross section of the core body 2 (hereinafter referred to as an annular axis B) extends in a circumferential direction about the axis A, forming an annular shape about the axis A.

Figure 5:
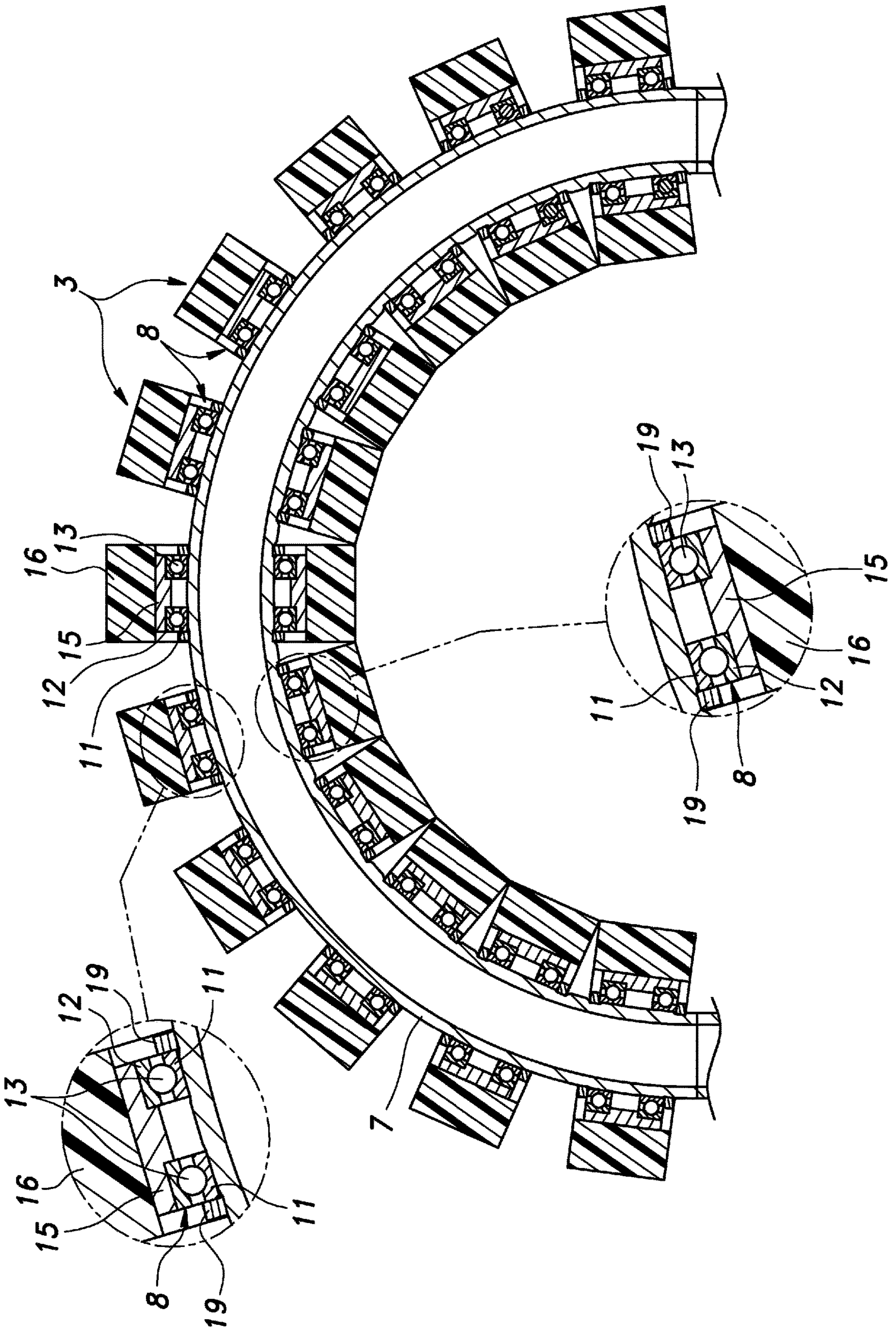
FIG. 5 is a cross-sectional view of the wheel and an enlarged view thereof.

As shown in FIG. 5, each free roller 3 is supported by the core body 2 via a bearing 8, which is a radial bearing. The bearing 8 may be a ball bearing having an inner race 11, an outer race 12, multiple balls 13 interposed between the inner race 11 and the outer race 12, and a retainer (not shown) holding the multiple balls 13.

Each free roller 3 includes a sleeve 15 and a rubber ring 16 provided on the outer peripheral surface of the sleeve 15. The sleeve 15 is preferably made of metal. The rubber ring 16 is preferably bonded to the outer peripheral surface of the sleeve 15 by vulcanization bonding or the like. The bearing 8 is disposed inside the sleeve 15. In this embodiment, two bearings 8 are spaced apart inside each sleeve 15, and the two bearings 8 are press-fit inside each sleeve 15.

The outer peripheral surface of the core body 2 is in pressure contact with the inner peripheral surface of the inner race 11 of each bearing 8. Thereby, the inner race 11 of each bearing 8 is fixed to the outer peripheral surface of the core body 2. In this embodiment, an annular collar 19 is provided on the outer peripheral surface of the core body 2. The collar 19 is fixed to the core body 2 by pressing the outer peripheral surface of the core body 2 against the inner peripheral surface of the collar 19. The collar 19 engages the edge of the inner race 11 and restricts the circumferential movement of each inner race 11 about the axis A with respect to the core body 2.

Each of the multiple free rollers 3 rotates about the annular axis B with respect to the core body 2. Further, each of the multiple free rollers 3 rotates with respect to the core body 2 about an axis parallel to a tangent line centered on the axis A.

Next, the outline of a wheel manufacturing method of the wheel 4 will be described.

An operator who manufactures the wheel 4 prepares the pipe material 7 bent in a semicircular shape in advance in a first step (first step) of the manufacturing process of the wheel 4. Next, the operator disposes multiple free rollers 3 each having a pair of bearings 8 and collars 19 at proper positions on the pipe material 7. After that, the operator introduces a liquid or gas into the inside of the pipe material 7 to pressurize the pipe material 7, thereby expanding the diameter of the pipe material 7 and fixing the inner race 11 of the bearing 8 to the pipe material 7. Thereby, each of the free rollers 3 is rotatably joined to the pipe material 7.

The operator prepares at least two pipe materials 7 (see FIG. 4) to which free rollers 3 are joined by performing the first step at least twice. After that, the operator butts the ends of the pipe materials 7 against each other and disposes them in an annular shape, then assembles them into the wheel manufacturing device 1 (see FIG. 1), and performs a second step of welding the ends of two adjacent pipe materials 7. As a result, the two adjacent pipe materials 7 are joined together to form the annular core body 2, forming the main wheel. The wheel manufacturing device 1 according to this embodiment is particularly suitable for holding and welding the pipe materials 7 in the second step.

Next, the configuration of the wheel manufacturing device 1 will be described.

As shown in FIG. 1, the wheel manufacturing device 1 includes a holder 21 and a laser welder 23. In this embodiment, the wheel manufacturing device 1 is placed on a work table 25 for manufacturing the wheel 4.

Figure 6:
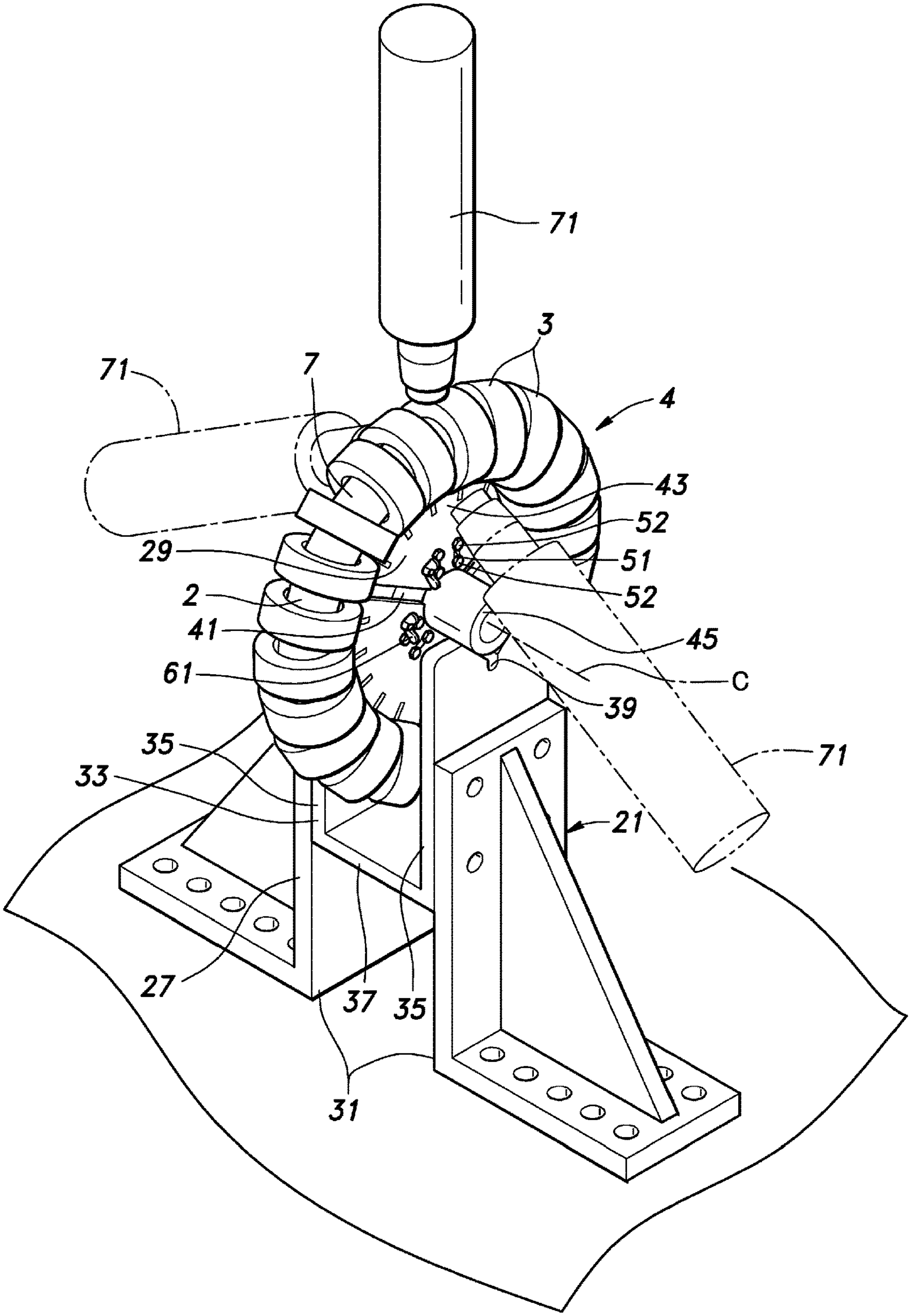
FIG. 6 is a perspective view showing a state in which the wheel is fixed to the holder and welding is being performed.

A holder 21 (also referred to as a wheel holding device) holds the arc-shaped pipe materials 7 provided with the free rollers 3 in a state of butting against each other during welding. As shown in FIG. 6, the holder 21 includes a support member 27 (also referred to as a pedestal) and a center jig 29 (also referred to as a center member) having a circular outer contour.

The support member 27 includes a pair of leg portions 31 and a base portion 33 supported by the pair of leg portions 31. Each of the leg portions 31 includes an L-shaped bracket. The support member 27 is fixed to the upper surface of the work table 25 on which the wheel manufacturing device 1 is placed.

The base portion 33 is made of a metal plate material having a substantially U-shape. The base portion 33 is disposed to open upward and is supported via the leg portions 31.

Specifically, the base portion 33 includes a pair of flat plate portions 35 extending in the vertical direction and disposed parallel to each other, and a horizontal portion 37 connecting the lower ends of the flat plate portions 35. The upper ends of the leg portions 31 are fixed to the respective corresponding flat plate portions 35. A V-shaped groove 39 recessed downward is provided at each upper end of the flat plate portion 35.

The center jig 29 includes a chuck 41, multiple bases 43 that are radially movably supported by the chuck 41 and that form an outer peripheral portion of the center jig 29, and a shaft 45 provided at the center of the chuck 41.

Figure 7:
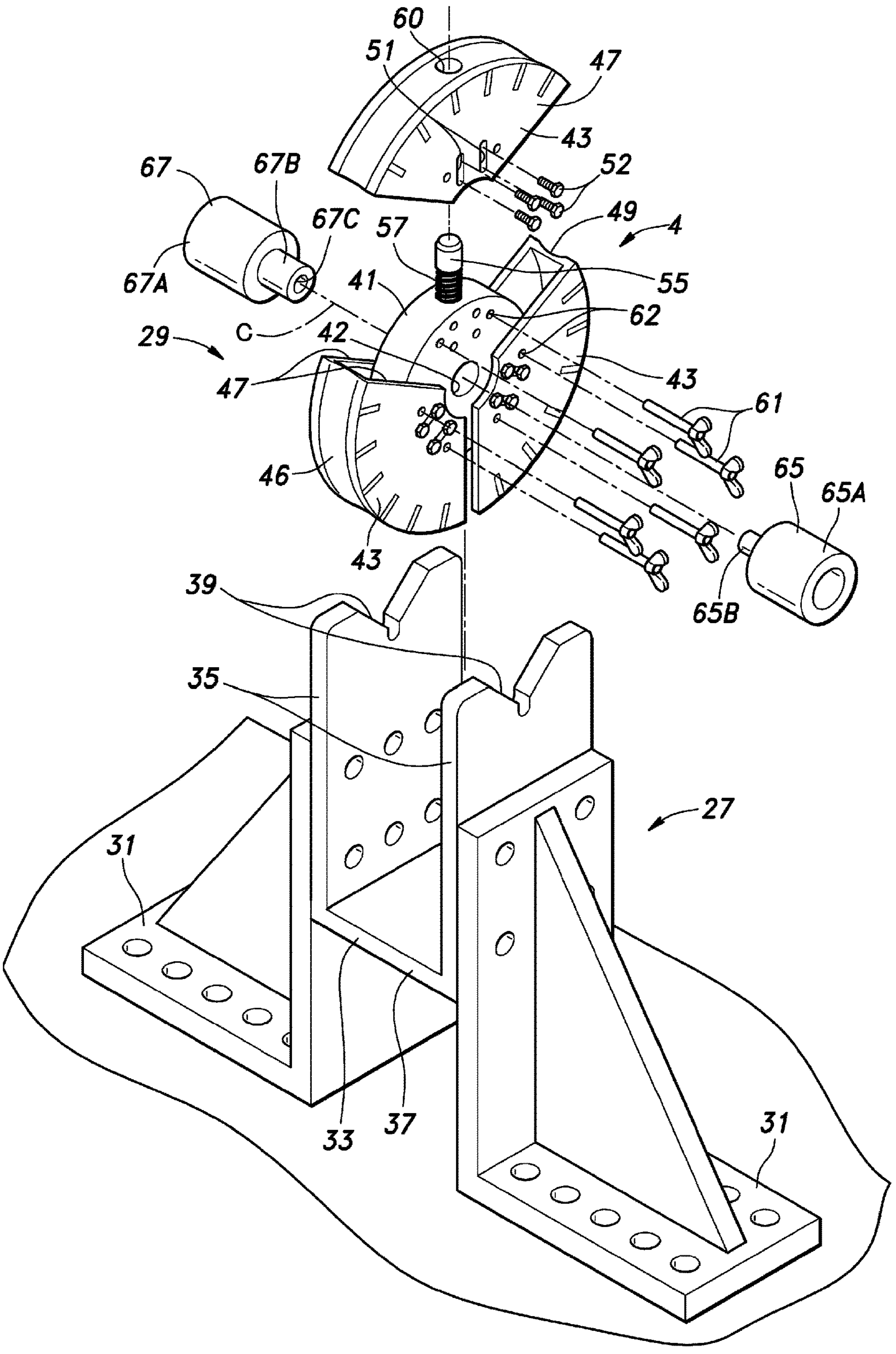
FIG. 7 is an exploded perspective view of the holder according to the embodiment.

As shown in FIG. 7, the chuck 41 is formed in a disk shape centered on a central axis C. The chuck 41 is preferably made of metal such as stainless steel. A chuck through hole 42 is provided penetrating through the center of the chuck 41 along the central axis C.

Each of the bases 43 has a peripheral wall portion 46 that faces the outer peripheral surface of the chuck 41 and extends in an arc shape in the circumferential direction, and a pair of side walls 47 that extend from the peripheral wall portion 46 along the side surface of the chuck 41 toward the central axis C side. Each of the pair of side walls 47 is preferably formed in a fan shape. The base 43 may be made of resin or the like, or may be made of metal such as stainless steel.

The outer peripheral portion of the peripheral wall portion 46 configures the outer peripheral surface of the center jig 29. When the pipe materials 7 are attached to the holder 21, the free roller 3 abuts against the outer peripheral portion of the peripheral wall portion 46 to hold the pipe material 7 in a state of butting against each other to maintain the pipe materials 7 in a proper annular shape. An engagement groove 49 (see also FIG. 12) for receiving at least a portion of the free roller 3 may be provided on the outer peripheral portion of the peripheral wall portion 46 so that the free roller 3 may be easily maintained at a proper position. Each of the bases 43 is preferably formed in the same shape as each other.

The width of the base 43 in the direction parallel to the central axis C is smaller than the width in the direction parallel to the axis A of the free roller 3.

As shown in FIGS. 6 and 7, the side wall 47 of each base 43 is formed with a guide groove 51 penetrating in the thickness direction. The guide groove 51 has an elongated hole shape extending radially outward. At least one guide pin 52 passing through the guide groove 51 is joined to the chuck 41. The contact of the guide pin 52 with the guide groove 51 restricts the moving direction of the base 43 with respect to the chuck 41 to be radially inward and outward. In this embodiment, two guide pins 52 are provided for one guide groove 51. By providing two or more guide pins 52 in the guide groove 51 in this way, the guide pins 52 abut on the guide groove 51, and the inclination angle of the base 43 with respect to the chuck 41 is maintained constant.

Thus, the movement of each base 43 with respect to the chuck 41 is restricted in the radial direction inward and outward by the contact between the guide groove 51 and the guide pin 52. Hereinafter, the position of the base 43 when the distance between the base 43 and the central axis C is minimized is referred to as the retraction position, and the position of the base 43 when the distance between the base 43 and the central axis C is maximized is referred to as the expansion position.

Figure 8:
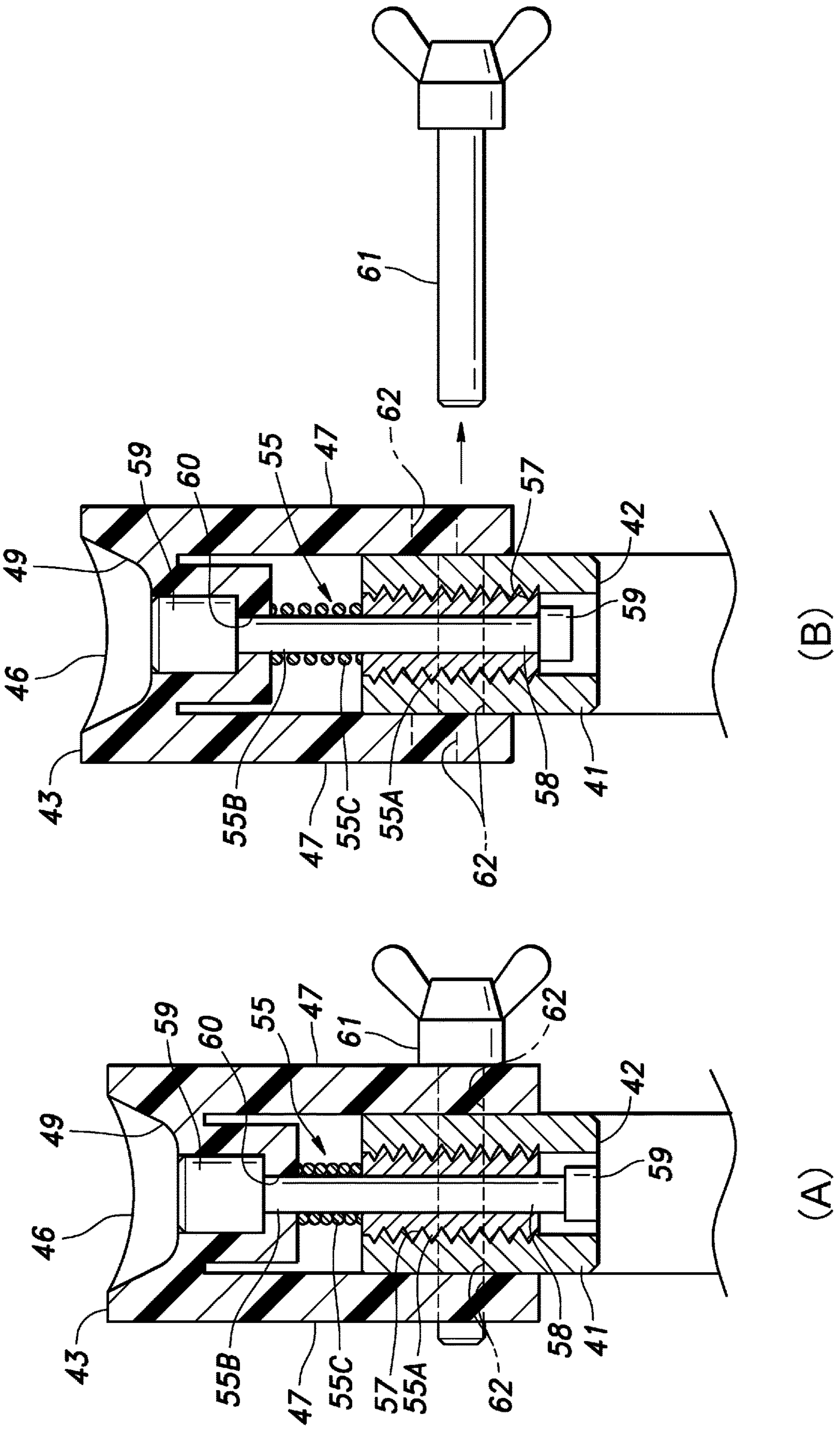
FIG. 8 are cross-sectional views of the center jig (A) in a state in which the lock member is inserted into the lock hole and (B) in a state in which the lock member is removed from the lock hole.

As shown in FIG. 7, each base 43 and the chuck 41 are connected by one or more spring ejector pins 55, respectively. As shown in FIG. 8, the spring ejector pin 55 includes a tubular body 55A in a tubular shape, a pin 55B received in the tubular body 55A to be slidable within a predetermined range along its axis, and a spring 55C provided on the outer periphery of the pin 55B.

A male thread is provided on the outer peripheral surface of the tubular body 55A. A screw hole 57 extending radially inward is provided on the outer peripheral surface of the chuck 41. The screw hole 57 may reach the chuck through hole 42. The tubular body 55A is inserted into the screw hole 57, and the tubular body 55A is screwed to the chuck 41.

The pin 55B includes a shaft portion 58 received in the tubular body 55A and two head portions 59 provided at two ends of the shaft portion 58. Each of the two head portions 59 have an outer diameter wider than the inner diameter of the tubular body 55A, and the head portion 59 on the other side is configured to have a wider outer diameter than the head portion 59 on one side. The head portion 59 on one side is accommodated in the chuck through hole 42. The head portion 59 on one side has an outer diameter that is smaller than the outer diameter of the tubular body 55A and larger than the inner diameter of the tubular body 55A. This restricts the radially outward movement of the head portion 59 on one side.

The outer wall of the base 43 is provided with a base through hole 60 having a smaller diameter than the head portion 59 on the other side. The shaft portion 58 passes through the through hole, and the head portion 59 on the other side is located radially outside the outer wall of the base 43. The head portion 59 on the other side is formed wider than the base through hole 60. This restricts the radially outward movement of the base 43 with respect to the chuck 41.

The spring 55C is provided between the tubular body 55A and the base 43 on the outer periphery of the pin 55B, and biases the tubular body 55A radially outward with respect to the base 43. This causes the spring 55C to bias the corresponding base 43 toward the expansion position.

As shown in FIGS. 6 and 7, the center jig 29 has multiple lock members 61 that are detachably attached to the chuck 41 and restrict movement of the base 43 with respect to the chuck 41 by coming into contact with each of the bases 43. As shown in FIGS. 7 and (A) and (B) of FIG. 8, the side wall of each base 43 and the chuck 41 are formed with lock holes 62, which are through holes. When the base 43 is pressed radially inward with respect to the chuck 41, the lock hole 62 provided in the side wall of the base 43 and the lock hole 62 provided in the chuck 41 are positioned to overlap each other (see (A) of FIG. 8). In addition, when the lock member 61 is pulled out from the lock hole 62, the base 43 moves radially outward due to the biasing force of the spring 55C (see (B) of FIG. 8). By inserting the lock member 61 into each lock hole 62, the movement of the base 43 with respect to the chuck 41 is prohibited, and the proper position is obtained. The lock member 61 may be, for example, a pin.

As shown in FIG. 6, the shaft 45 is provided at the center of the chuck 41 and includes a columnar metal member having the central axis C as its axis. In this embodiment, the shaft 45 is fitted into the chuck through hole 42 (see FIG. 7) and fixed to the chuck 41. Two ends of the shaft 45 are inserted into the grooves 39 from above and received in the grooves 39.

By receiving the two ends of the shaft 45 in the grooves, the pipe material 7 is held from both sides of the central axis C (both outer sides of the side walls 47 of the base 43). As a result, the pipe material 7 may be well and stably held with a simple configuration.

Further, the center jig 29 is supported by receiving the shaft 45 in the grooves 39. Therefore, the pipe material 7 may be held by the support member 27 to be rotatable about the central axis C. As a result, the position of the pipe material 7 may be easily adjusted so that the position of the pipe material 7 to be welded by the operator who performs manufacturing is at a proper position where the laser welder 23 performs welding.

In this embodiment, as shown in FIG. 7, the shaft 45 includes a first member 65 inserted into the chuck through hole 42 from one side and a second member 67 joined to the first member 65 on the other side of the chuck through hole 42.

Figure 9:
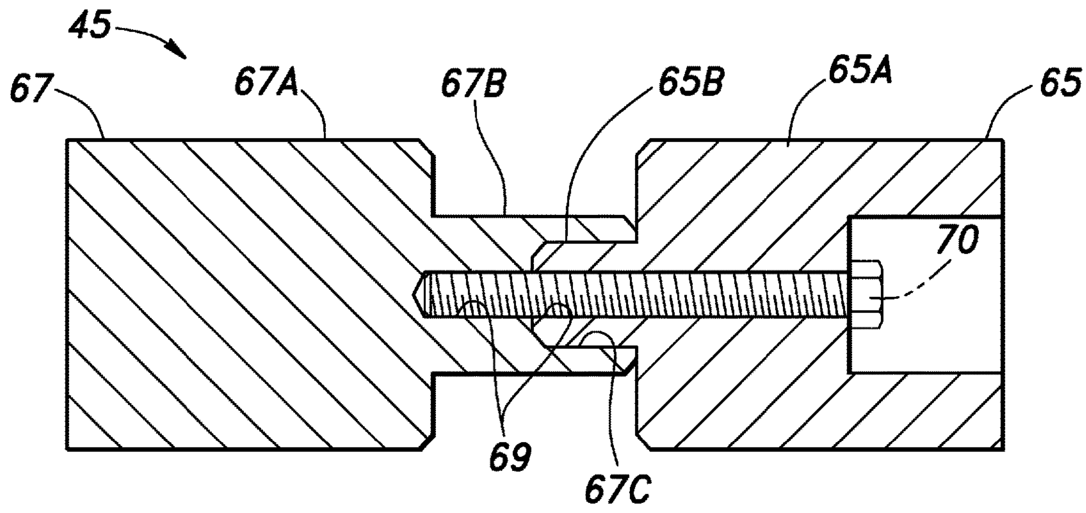
In FIG. 9, (A) is a cross-sectional view of a shaft according to an embodiment, and (B) is a modified example thereof.
Figure 9:
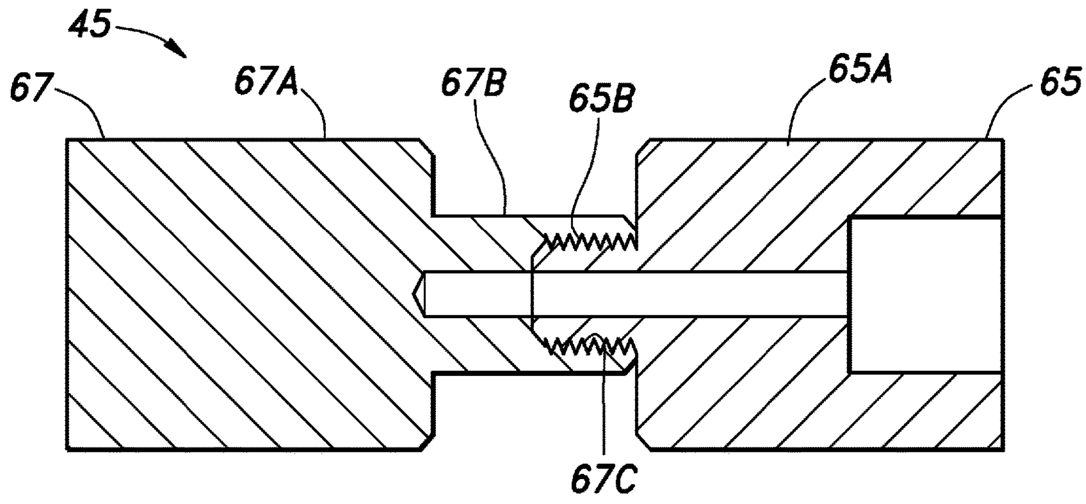

As shown in (A) and (B) of FIG. 9, the first member 65 includes a columnar first member head portion 65A and a first member shaft portion 65B which is narrower in the radial direction than the first member head portion 65A and protrudes from the first member head portion 65A along the central axis of the first member head portion 65A. The first member head portion 65A is wider in the radial direction than the inner diameter of the chuck through hole 42.

The second member 67 includes a columnar second member head portion 67A and a second member shaft portion 67B which is narrower in the radial direction than the second member head portion 67A and protrudes from the second member head portion 67A along the central axis of the second member head portion 67A. The second member shaft portion 67B is provided with a second member recessed portion 67C which is recessed in the opposite direction of the protruding end and is capable of receiving the tip of the first member shaft portion 65B. The second member head portion 67A is wider in the radial direction than the inner diameter of the chuck through hole 42.

The first member 65 is inserted into the chuck through hole 42 from one side, the second member 67 is disposed on the other side of the chuck through hole 42, and the tip of the first member shaft portion 65B is inserted into the second member recessed portion 67C. In this way, the second member 67 may be joined to the first member 65. Thereby, the operator may easily assemble the shaft 45. Moreover, since the shaft 45 is configured by two members, the configuration is simple.

In this embodiment, as shown in (A) of FIG. 9, the first member 65 and the second member 67 are each provided with a screw hole 69 that communicates in the central axis direction. By inserting a screw 70 into the screw holes 69, the first member 65 and the second member 67 may be firmly joined.

However, a way of joining the first member 65 and the second member 67 is not limited to this. For example, as shown in (B) of FIG. 9, a male thread may be provided on the outer peripheral surface of the first member shaft portion 65B, and a female thread that is screwed to the male thread may be provided in the second member recessed portion 67C, so that the first member 65 and the second member 67 may be joined by screwing the first member shaft portion 65B into the second member recessed portion 67C.

When the base 43 is in a proper position with respect to the chuck 41, the first member head portion 65A and/or the second member head portion 67A of the shaft 45 abut against the radially inner side of the base 43, whereby it may be configured to restrict the radially inward movement of the base 43. As a result, the base 43 may be held at a proper position with respect to the chuck 41 with a simple configuration.

The holder 21 may also include a clamping device that clamps the multiple free rollers 3 in the circumferential direction of the wheel 4, a band member, or the like. However, the clamping device and the band member are optional, and are appropriately provided on the holder 21 as needed.

The laser welder 23 welds adjacent pipe materials 7 held by the holder 21 by irradiating a laser. The core body 2 is formed by welding (butt welding) adjacent pipe materials 7 to each other. The laser welder 23 may be a device that performs welding using any laser such as a YAG laser, a CO2 laser, a fiber laser, and a disk laser.

The laser welder 23 includes a head 71 for irradiating the pipe materials 7 with a laser, a manipulator 73 for moving the head 71, and a controller 75 for driving and controlling the manipulator 73.

The head 71 has a substantially columnar shape extending in a predetermined direction about the axis. The head 71 irradiates a laser along the optical axis E extending in its extending direction from an end surface on one end side in its extending direction (hereinafter referred to as an irradiation end 71A). The end of the head 71 on the irradiation end 71A side may be configured to have a size that allows it to be inserted between adjacent free rollers 3.

The manipulator 73 is fixed to the work table 25 at its base end, and includes a multi-joint robot arm having the head 71 at its tip end. By driving the joints, the manipulator 73 may move the head 71 along the trajectory specified by the controller 75 and in the posture specified by the controller 75. FIGS. 1 and 6 also show an example of the position of the head 71 by a one-dot chain line and a two-dot chain line.

Figure 10:
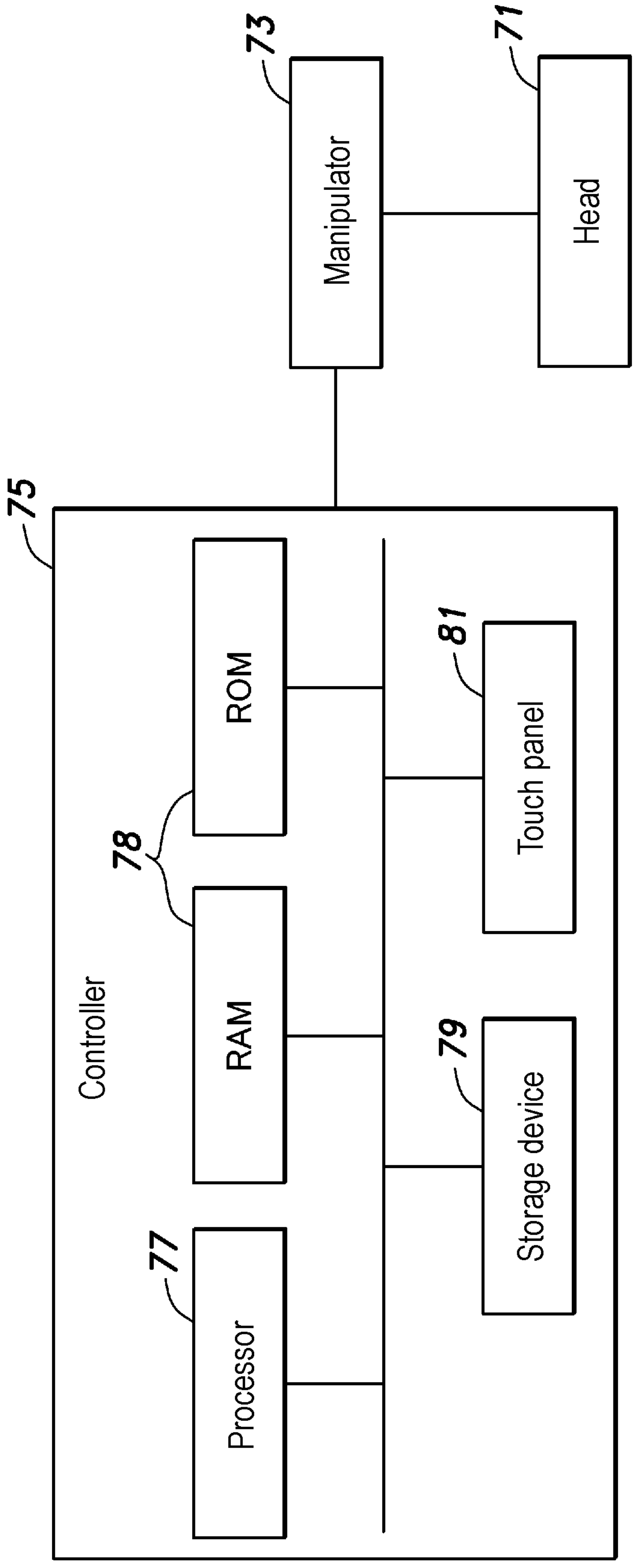
FIG. 10 is a block diagram of a laser welder.

As shown in FIG. 10, the controller 75 is configured by a computer including a processor 77 configured by a central processing unit (CPU) or the like, a memory 78 configured by a random access memory (RAM), a read only memory (ROM) or the like, and a storage device 79 configured by a solid state drive (SSD), a hard disk drive (HDD) or the like. The controller 75 also includes a touch panel 81. The touch panel 81 functions as an input/output device that receives input from the operator and displays information to the operator.

Figure 11:
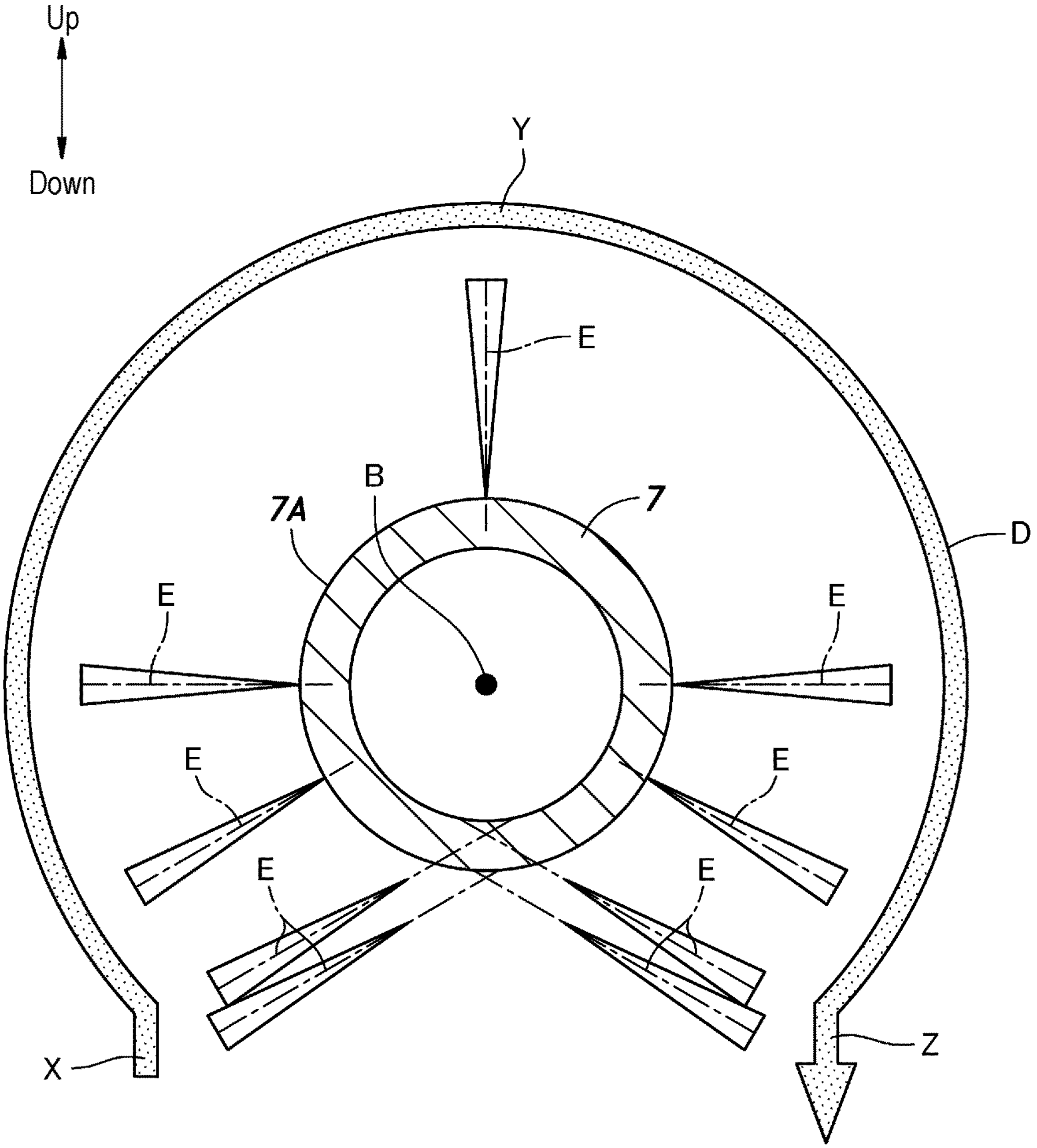
FIG. 11 is a schematic view showing setting inputs related to the irradiation direction of the laser.

The controller 75 receives information from the operator on the touch panel 81 regarding the movement trajectory D of the head 71 and the orientation of the optical axis E at each position on the trajectory (see FIG. 11, for example). When the controller 75 receives an input related to the start of work on the touch panel 81, the head 71 moves along the movement trajectory D and drives the manipulator 73 so that the optical axis E of the head 71 is oriented in the input direction, and welding is performed by irradiating a laser from the head 71.

Next, details of the second step of holding and welding the pipe materials 7 will be described.

The operator butts and temporarily fixes both ends of two pipe materials 7 to which the free rollers 3 have been attached (that is, the first step has been completed) to form the wheel 4 before final welding. After that, the operator performs a holding step of holding the pipe materials 7 in a state of butting against each other on the outer periphery of the center jig 29 having a circular outer contour by setting the pipe materials 7 on the holder 21.

In the holding step, the operator first pulls out the lock member 61 inserted into the lock hole 62 of the center jig 29 and expands the diameter of the base 43 with respect to the chuck 41. After that, the operator inserts the lock member 61 inside the wheel 4 before final welding, and inserts the lock member 61 into the lock hole 62 while reducing the diameter of the base 43. Thereby, each base 43 is maintained at a proper position with respect to the chuck 41.

After that, the operator attaches the first member 65 and the second member 67 that configure the shaft 45. As a result, the radially inner end of the base 43 comes into contact with the first member 65 or the second member 67 that configures the shaft 45, and the radially inward movement of the base 43 is restricted.

The operator makes two ends of the shaft 45 be received in the grooves 39 provided at the upper ends of the base portions 33. As a result, the wheel 4 before final welding is supported by the holder 21 to be rotatable around the axis extending in the horizontal direction, and the holding step is completed. At this time, the free roller 3 is received in the engaging groove 49.

Next, the operator performs a welding step of welding the adjacent pipe materials 7 by irradiating a laser. In the welding step, the operator first uses the touch panel 81 of the controller 75 to input settings related to the movement trajectory D and the orientation of the optical axis E at each position of the head 71 schematically shown in FIG. 11. In FIG. 11, the movement trajectory D of the head 71 is schematically indicated by a thick arrow, and the posture of the head 71 at each position is indicated by a triangle, and the optical axis E at each point is indicated by a one-dot chain line.

As shown in FIG. 11, the movement trajectory D of the head 71 includes a first region X, a second region Y, and a third region Z. In the first region X, the head 71 slides upward (away from the central axis C) from the position where the optical axis E extending from the irradiation end 71A is at the lower end of the pipe member 7 (the end on the side close to the central axis C). In the second region Y, the head 71 rotates about the annular axis B of the pipe material 7. In the third region Z, the head 71 slides downward until the optical axis E extending from the irradiation end 71A reaches the lower end of the pipe material 7.

Figure 12:
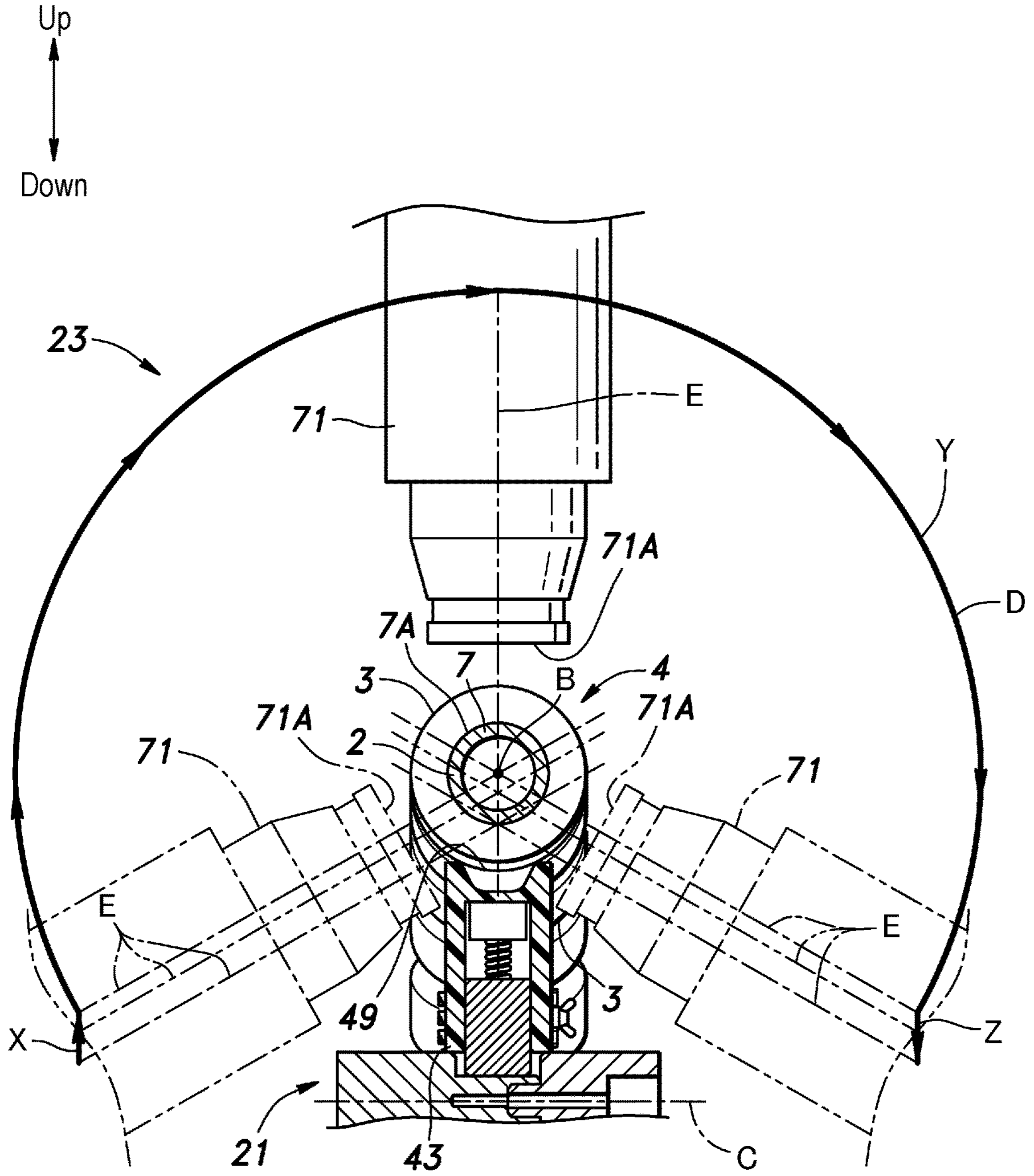
FIG. 12 is an illustration view for illustrating movement of the head during laser irradiation.

As shown in FIG. 12, in the first region X and the second region Y, at least a portion of the head 71 may be disposed at a position overlapping the free roller 3 when viewed in the axial direction of the pipe material 7. In this way, the head 71 may be brought close to the pipe material 7. In this way, the pipe material 7 may be welded more reliably. Moreover, the wheel manufacturing device 1 may be configured compactly.

As shown in FIG. 11, in the first region X and the third region Z, the operator sets the optical axis E to face the portion below the lower half of the pipe material 7, that is, the portion close to the central axis C of the pipe material 7. In addition, in the first region X and the third region Z, the operator sets the optical axis E in a direction inclined from a direction orthogonal to the outer peripheral surface 7A of the pipe member 7 (segment) away from the central axis C, that is, to be more horizontal.

In addition, in the second region Y, the operator sets the optical axis E to face the upper portion of the pipe material 7 (that is, a portion away from the central axis C of the pipe material 7) more than in the first region X and the third region Z. Further, in the second region Y, the operator sets the optical axis E in a direction orthogonal to the outer peripheral surface 7A of the pipe material 7 (segment).

When the setting input is completed, the operator adjusts the posture of the wheel 4 before the final welding so that one of the temporary welded portions of the two pipe materials 7 is at the upper end, and then makes an input for starting work on the touch panel 81. When an input for starting work is made on the touch panel 81, the controller 75 (more specifically, the processor 77) executes the welding process. In the welding process, the processor 77 drives and controls the manipulator 73 and the head 71 so that the head 71 moves along the setting input and one of the temporarily welded portions is irradiated with the laser. As a result, one of the temporarily welded portions is welded, and the ends of adjacent pipe materials 7 (segments) forming one of the temporarily welded portions are finally welded to each other.

Next, the operator rotates the wheel 4 before final welding so that the other of the temporary welded portions of the two pipe materials 7 is at the upper end, and then makes an input for starting work on the touch panel 81. When an input for starting work is made on the touch panel 81, the controller 75 (more specifically, the processor 77) executes the welding process. In the welding process, the processor 77 drives and controls the manipulator 73 and the head 71 so that the head 71 moves along the setting input and the other of the temporarily welded portions is irradiated with the laser. As a result, the other of the temporarily welded portions is welded, and the ends of adjacent pipe materials 7 (segments) forming the other of the temporarily welded portions are finally welded to each other.

After the final welding is completed, the operator removes the shaft 45 from the chuck 41. This allows the base 43 to move toward the central axis C side. By moving the multiple bases 43 toward the central axis C against the biasing force of the spring 55C, the inner peripheral portion of the wheel 4 and the outer peripheral portion of the multiple bases 43 are separated, and the wheel 4 is removed from the center jig 29.

Next, effects of the wheel manufacturing device 1 configured as described above and the wheel manufacturing method of the wheel 4 will be described.

Of the temporarily welded portions of the pipe materials 7, the portion of the annular axis B away from the axis A (central axis C) may be accessed from the radially outer side of the core body 2, so welding is relatively easy. On the other hand, the portion of the annular axis B near the axis A (the central axis C) needs to be accessed from the radially inner side of the core body 2, so welding is not easy.

The wheel manufacturing device 1 includes a laser welder 23 capable of performing welding from a position farther than TIG welding. When the head 71 is located in the second region Y, the portion of the pipe material 7 away from the central axis C is welded, and at this time, the optical axis E of the laser is set in a direction orthogonal to the outer peripheral surface 7A of the pipe material 7. Further, when the head 71 is located in the first region X or the third region Z, the portion of the pipe material 7 adjacent to the central axis C is welded, and at this time, the laser is set to be oriented in a direction (non-orthogonal direction) inclined from a direction orthogonal to the outer peripheral surface 7A of the pipe member 7. Specifically, the optical axis E of the laser is set in a direction away from the central axis C, that is, in a direction inclined in the horizontal direction.

As a result, as shown in FIG. 12, interference between the free roller 3 and the laser welder 23 and interference between the laser welder 23 and the holder 21 may be avoided in the portion near the central axis C of the pipe material 7 while the pipe material 7 may be welded. Therefore, according to the wheel manufacturing device 1 and the wheel manufacturing method for the wheel 4 according to the disclosure, it is possible to provide a wheel manufacturing device 1 and a wheel manufacturing method for the wheel 4 capable of easily manufacturing the wheel 4 having the annular pipe material 7 and multiple free rollers 3 rotatably supported by the pipe material 7.

The free roller 3 is received in the engagement groove 49 when the wheel 4 is held by the holder 21. As shown in FIG. 12, the width of the base 43 in the direction parallel to the central axis C is smaller than the width of the free roller 3 in the direction parallel to the central axis C (axis A). Therefore, compared with the case where the width of the base 43 in the direction parallel to the central axis C is greater than the width of the free roller 3 in the direction parallel to the central axis C, the wheel manufacturing device 1 may be made smaller. Further, by reducing the width of the base 43 in the direction parallel to the central axis C, the movement of the head 71 of the laser welder 23 is less likely to be hindered by the base 43 when a portion of the annular axis B near the axis A (the central axis C) is welded, and the welding work for the pipe material 7 (core body 2) from the radially inner side is facilitated.

Further, the shaft 45 is located radially inside the base 43. Therefore, the holder 21 may be compactly configured, and the shaft 45 and the head 71 are less likely to interfere with each other during welding, and the movement of the head 71 of the laser welder 23 is less likely to be hindered by the shaft 45.

The center jig 29 is rotatably supported by the base portion 33 by receiving the two ends of the shaft 45 in the grooves 39. By rotating the center jig 29, it is easy for an operator performing manufacturing to adjust the position of the pipe material 7 to be welded to a proper position.

Next, an example of use of the wheel 4 manufactured in this manner will be described. The wheels 4 is mainly used in the omnidirectional mobile device 5. As shown in FIG. 2, the omnidirectional mobile device 5 includes, for example, a frame 91, a pair of drive discs 92 rotatably supported by the frame 91, an annular wheel 4 disposed between the pair of drive discs 92, and a pair of electric motors for rotating the drive discs 92, respectively. The pair of drive discs 92 transmit the driving force of the electric motors to the wheel 4.

The frame 91 has a pair of side wall portions extending downward from the lower portion of the vehicle body. As shown in FIG. 2, a support shaft 97 extending in the left-right direction spans the lower ends of the pair of frames 91. The pair of drive disks 92 are rotatably supported by the support shaft 97. The pair of drive disks 92 rotate about the axis of the support shaft 97. The position of each drive disk 92 in the left-right direction is restricted with respect to the support shaft 97. Each drive disk 92 faces each other with a distance in the left-right direction.

The drive discs 92 are disposed on both sides of the annular wheel 4 and apply frictional force to the wheel 4 to rotate the wheel 4 about the axis A and the annular axis B. The drive disc 92 includes a disc-shaped base 101 rotatably supported by the frame 91 and multiple drive rollers 102 rotatably supported on the outer periphery of the base 101 while tilting against each other and in contact with the wheel 4. The base 101 is disposed coaxially with the support shaft 97.

Driven pulleys 104 are provided on opposite surfaces of each drive disk 92. The driven pulley 104 is provided coaxially with the drive disk 92. The driven pulley 104 is connected by a belt 106 to a drive pulley provided on the output shaft of the electric motor. Each electric motor rotates independently of each other, so that each drive disk 92 rotates independently of each other.

In each omnidirectional mobile device 5, when the pair of drive discs 92 rotate in the same direction at the same rotational speed, the wheel 4 rotates together with the pair of drive discs 92. That is, the wheel 4 rotates forward or backward about the axis A. At this time, the drive roller 102 of the drive disc 92 and the free roller 3 of the wheel 4 do not rotate with respect to the core body 2. In each omnidirectional mobile device 5, when a rotational speed difference occurs between the pair of drive discs 92, with respect to the force in the circumferential (tangential) direction caused by the rotation of the pair of drive discs 92, a force component perpendicular to this force acts on the free roller 3 of the wheel 4 from the left and right drive rollers 102. Since the axis of the drive roller 102 is inclined with respect to the circumferential direction of the drive roller 102, a force component is generated between the drive disks 92 due to the rotational speed difference. This force component causes the drive roller 102 to rotate relative to the base 101 and causes the free roller 3 to rotate relative to the core body 2. As a result, the wheel 4 generates a driving force in the left-right direction.

The left and right omnidirectional mobile devices 5 rotate forward at the same speed to move the vehicle body forward. The left and right omnidirectional mobile devices 5 rotate backward at the same speed to move the vehicle body backward. The vehicle body turns rightward or leftward due to the speed generated in the rotation of the left and right omnidirectional mobile devices 5 in the front-rear direction. The rotation of the free rollers 3 of the wheels 4 of the left and right omnidirectional mobile devices 5 causes the vehicle body to move in parallel to the right or left.

Although specific embodiments have been described above, the disclosure is not limited to the above embodiments and may be widely modified. The support member 27 may have a mechanism for changing the height and orientation of the center jig 29. The shape and number of bases 43 may be changed as desired.

The movement trajectory D may be changed as long as it includes the first region X, the second region Y, and the third region Z. For example, a region may be provided between the first region X and the second region Y, for example, in which the optical axis E is changed to be perpendicular to the outer peripheral surface 7A while the head 71 is raised. Further, a region may be provided between the second region Y and the third region Z in which the optical axis E is gradually changed to be horizontal while the head 71 is lowered.

What is claimed is:

1. A wheel manufacturing device for manufacturing a wheel having an annular core body configured by a plurality of arc-shaped segments joined to each other and a plurality of free rollers rotatably provided around an annular axis of the core body, the wheel manufacturing device comprising:

a holder that comprises a center jig having a circular outer contour and holds the segments in a state of butting against each other on an outer periphery of the center jig; and a laser welder that welds adjacent segments by irradiating a laser, wherein the laser welder sets an optical axis of the laser in a direction orthogonal to an outer peripheral surface of each segment when welding a portion of the outer peripheral surface of the respective segment away from a central axis of the annular axis, and sets the optical axis in a direction inclined away from the central axis with respect to the direction orthogonal to the outer peripheral surface of the respective segment when welding a portion of the outer peripheral surface of the respective segment close to the central axis.

2. The wheel manufacturing device according to claim 1, wherein the laser welder comprises a head that irradiates the laser and a manipulator that moves the head, and the manipulator disposes at least a portion of the head at a position overlapping the free roller as viewed in an axial direction of the respective segment when the respective segment is welded.

3. The wheel manufacturing device according to claim 1, wherein the holder holds the segments from two sides of the central axis.

4. The wheel manufacturing device according to claim 1, wherein the holder further comprises a support member that supports the center jig, the center jig comprises a chuck, a plurality of bases radially movably supported by the chuck and capable of being in contact with the free roller by moving radially outward, and a shaft provided at a center of the chuck, and the support member supports two ends of the shaft.

5. The wheel manufacturing device according to claim 4, wherein the shaft is located radially inside the base.

6. The wheel manufacturing device according to claim 5, wherein the shaft restricts a radially inward movement of the base by contacting a radially inner side of the base.

7. The wheel manufacturing device according to claim 6, wherein the chuck comprises a through hole through which the shaft passes, and the shaft comprises a first member inserted into the through hole from one side and a second member joined to the first member on the other side of the through hole.

8. The wheel manufacturing device according to claim 7, wherein the first member and the second member are provided with screw holes communicating with each other in an axial direction.

9. The wheel manufacturing device according to claim 5, wherein the chuck comprises a through hole through which the shaft passes, and the shaft comprises a first member inserted into the through hole from one side and a second member joined to the first member on the other side of the through hole.

10. The wheel manufacturing device according to claim 9, wherein the first member and the second member are provided with screw holes communicating with each other in an axial direction.

11. The wheel manufacturing device according to claim 4, wherein the chuck comprises a through hole through which the shaft passes, and the shaft comprises a first member inserted into the through hole from one side and a second member joined to the first member on the other side of the through hole.

12. The wheel manufacturing device according to claim 11, wherein the first member and the second member are provided with screw holes communicating with each other in an axial direction.

13. The wheel manufacturing device according to claim 4, wherein the support member comprises a V-shaped groove that is recessed downwardly for respectively receiving the two ends of the shaft.

14. The wheel manufacturing device according to claim 4, wherein a width of the base in a direction parallel to the central axis is smaller than a width of the free roller in the direction parallel to the central axis.

* * * * *